Aug. 8, 1961     R. S. SHERRY ET AL     2,995,746
RADAR SYSTEM WITH ALTITUDE AMBIGUITY RESOLVER
Filed Nov. 25, 1952
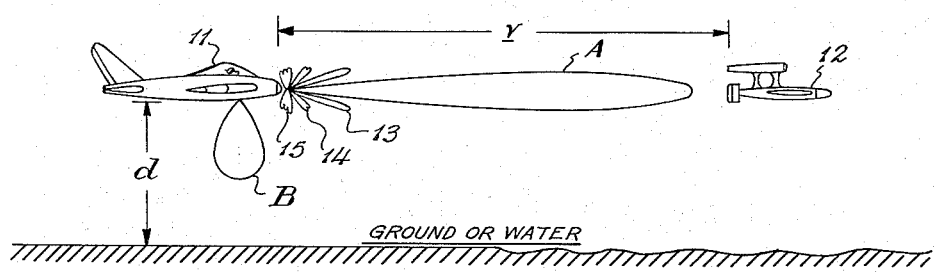
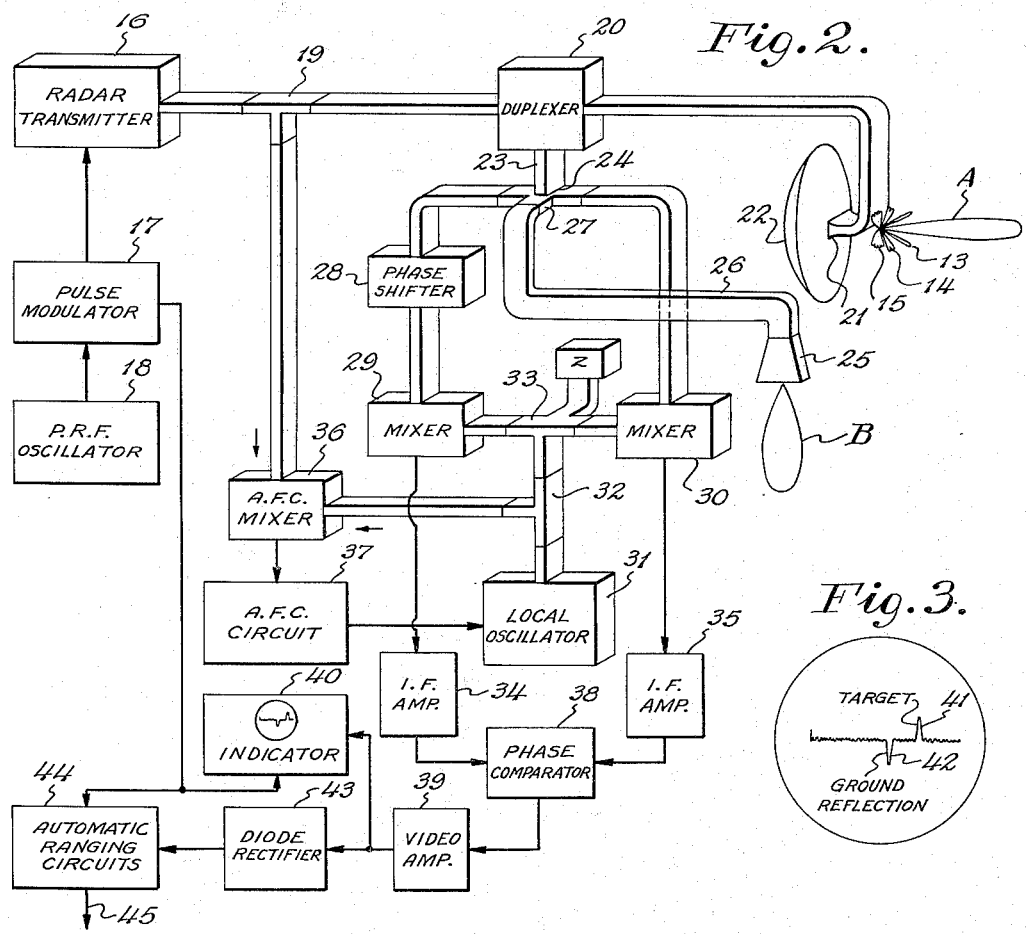
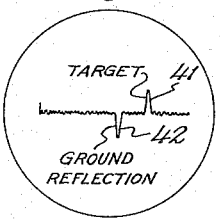
INVENTORS
ROBERT S. SHERRY
GORDON K. SLAUGHTER
BY
Thomas M. Ferrill Jr.
ATTORNEY // 2,995,746
RADAR SYSTEM WITH ALTITUDE
AMBIGUITY RESOLVER
Robert S. Sherry, New Hyde Park, and Gordon K.
Slaughter, Roslyn Heights, N.Y., assignors to Sperry
Rand Corporation, a corporation of Delaware
Filed Nov. 25, 1952, Ser. No. 322,428
11 Claims. (Cl. 343—13)

This invention relates to improvements in radar systems and, in particular, to an airborne radar system for distinguishing between a reflection from an airborne target and a reflection from the earth.

In an "air-to-air" radar system, i.e., a radar system of the type employed by a fighter aircraft to measure the range of an airborne target, such as a missile, a serious problem has existed heretofore in attempting to correctly and continuously measure the range of the target as it flies at a low altitude over the surface of the earth. This problem exists because the radar system not only receives a radar echo from the target but also a reflection from the surface of the earth directly below the aircraft. Since any high gain radar antenna system possesses side lobes which radiate energy at many angular directions from the main directive axis of the antenna, the energy from any one of these lobes when radiated downward in the direction of a large and efficient reflecting surface, such as the earth, is sufficient to return a reflection that is as large as or larger than the reflection received from a smaller target by the main beam. This reflection from the earth, sometimes referred to as an "altitude return," appears to the radar system as another target, and where the target and the earth are approximately equi-distant from the radar, the reflection from the earth easily can be mistaken as the target reflection signal. For the example where the target range is greater than the perpendicular distance to the earth, the ranging circuits of the radar system can erroneously measure the range along the line of the reflection to the earth instead of the range to the target. It is a primary feature of the present invention to provide an air-to-air radar system for eliminating this difficulty.

Accordingly, an object of the present invention is to provide an air-to-air radar system capable of distinguishing between a target echo and a reflection from the earth where the target and the earth are approximately equi-distant from the radar system.

Another object of the invention is to provide an air-to-air radar system for automatically measuring the range of a target without interference from a reflection from the earth occurring at approximately the same range as the target.

Yet another object of the invention is to provide an air-to-air radar system for automatically tracking a target in range as the target range varies from less than to greater than the range of an undesired reflection from the earth.

Still another object is to provide an air-to-air radar system for providing a pulse output voltage of one polarity representing target echoes and for providing a pulse output voltage of opposite polarity representing undesired reflections from the earth.

In accordance with the present invention, there is introduced an air-to-air radar system employing a first directive antenna for radiating pulses of energy over a main lobe in the direction of an expected target and collecting a portion of the energy reflected from the target. The first antenna also radiates pulses of energy over a side lobe toward the earth and collects a portion of the energy reflected upward from the earth. A second antenna having a main lobe of less directivity and lower gain is directed toward the earth and is receptive to a portion of the energy reflected upward from the earth. In the preferred form of the invention, the second antenna is more strongly receptive to energy reflected upward from the earth than the first directive antenna. The reflected energies from a target and from the earth collected by the first antenna are combined in a circuit with the reflected energy from the earth collected by the second antenna. The combining circuit produces two separate output signals, one representing the sum of the reflected energies collected by the first and second antennas and the other representing the difference of the reflected energies collected by the first and second antennas. The reflected energy from a target is distinguished from the reflected energy from the earth by comparing the relative phases of these two output signals in a phase comparator. The phase comparator produces an output voltage having a pulse of one polarity representing the target and a pulse of the opposite polarity representing the reflections from the earth.

The above objects of and the brief introduction to the present invention will be more fully understood and further objects and advantages will become apparent from a careful study of the following detailed description in connection with the drawings, wherein, FIG. 1 is a schematic illustration of a tactical use of an air-to-air radar system operating in the presence of a strong reflection from the earth, which will be referred to in explaining the present invention;

FIG. 2 is a block diagram of the air-to-air radar system of the invention; and

FIG. 3 is an illustration of the radar cathode ray tube indicator display showing the distinction between the representation of a target and the representation of a reflection from the earth.

Referring now to FIG. 1, an aircraft 11 containing an air-to-air radar system is shown in pursuit of a target 12, illustrated as a missile, flying low over the surface of the earth. The aircraft 11 is illustrated as flying at an altitude $d$ over the surface of the earth which is less than the range $r$ between aircraft and target. The antenna of the radar system is pointed substantially in the direction of flight of aircraft 11 and alternately radiates energy toward the target and receives reflections therefrom over the main lobe A. Simultaneously, a portion of the transmitted energy is radiated downward from the antenna side lobes 13, 14 and 15 toward the large reflecting surface area of the earth. The energy radiated vertically downward through side lobe 15 toward the reflecting surface of the earth directly below the aircraft returns a reflection which is collected by the radar antenna due to the response of its side lobe 15. This particular reflection from the surface of the earth, which may be either the ground or water, appears to the radar system as another target.

Even though the energy radiated vertically downward from side lobe 15 is greatly reduced relative to the energy radiated toward the target 12 over main lobe A, the reflected energy from the larger surface area of the earth directly below the aircraft 11 may be as large as or larger than the energy reflected from the relatively small target 12. This is especially true if the aircraft 11 is flying over water. Such a reflection from the surface of the earth may be mistaken for the target when both the earth and the target are approximately equi-distant from the aircraft, and the automatic ranging circuits of the radar system can erroneously measure the range to the earth instead of the range to the target. When the aircraft is flying at an altitude less than the range to the target, the ground reflection arrives at the radar system sooner than the arrival of the target reflection. Thus, a conventional air-to-air radar system designed to automatically and continuously measure the range to the nearest target would measure the range to the ground reflection instead of the target.

The present invention eliminates this difficulty by employing an auxiliary receiving antenna providing a radiation pattern B directed vertically downward for receiving the reflections from the earth, and this auxiliary antenna coperates with and forms an integral part of the improved air-to-air radar system now to be described.

Referring to the block diagram in FIG. 2 of the radar system of the present invention, a conventional radar transmitter 16 is periodically keyed by short pulses from pulse modulator 17 at a pulse repetition frequency determined by P.R.F. oscillator 18. The transmitter output pulses of energy are supplied through a wave guide coupler 19 and through a duplexer 20 to the wave guide feed 21 disposed in the vicinity of the focus of paraboloidal reflector 22. The duplexer 20 may be of the type known in the art as the "cloverleaf" duplexer or any of the other suitable types. The pulses of energy illuminating the reflector 22 are radiated to produce the highly directive radiation pattern having a main lobe A and side lobes 13, 14 and 15.

A target illuminated by the pulse energy in lobe A reflects a small percentage of this energy, a portion of which is collected by the paraboloidal reflector 22 and supplied back through the wave guide feed 21 to the duplexer 20. The duplexer 20 diverts this received energy into the series arm 23 of a hybrid junction or "magic tee" 24 where it is equally divided into a first portion which is conveyed through one of the symmetrical arms of the junction, and into a second portion which is conveyed through the other symmetrical arm of the junction.

Similarly, pulse energy radiated downward toward the earth by side lobe 15 reflects a high percentage of the pulse energy due to the larger reflecting surface area of the earth, and portions of this reflected energy are collected by both the paraboloidal reflector 22, due to the response of its side lobe 15, and also by the small horn antenna 25 having the relatively broad radiation pattern B. The amount of the reflected energy from the earth collected by reflector 22 due to the response of its side lobe 15, which will be referred to as energy $a$, is less than the reflected energy from the earth collected by the horn 25, which will be referred to as energy B, due to the designs of the reflector 22 and the horn antenna 25. The reflector 22 is designed to have a relatively large aperture in comparison to the aperture of horn 25 to produce the desired high gain and directivity in the main lobe A. Such a highly directive antenna possesses side lobes illustrated at 13, 14 and 15. In the preferred form of the invention, the horn 25 is designed to have a relatively broad directivity pattern and a gain which is appreciably larger than the gain provided by the reflector 22 in the response of its side lobe 15 but with a gain less than the gain in the main lobe A of reflector 22. With this design, the horn 25 is more strongly responsive to energy reflected upward from the earth than the response of reflector 22 due to its side lobe 15. Moreover, the horn 25 has a negligible response to energy reflected from a target, especially in comparison with the response of the main lobe A of reflector 22.

Should the horn 25 provide less gain in its lobe B than the gain provided in the response of side lobe 15 of the reflector 22, an amplifier must be provided in the output of the horn to increase the magnitude of the reflected energy collected by the horn to exceed the reflected energy collected by reflector 22 in the response of its side lobe 15.

The ground reflected energy $a$ collected by reflector 22 in its side lobe response is supplied through the wave guide feed 21 and the duplexer 20 to the series arm 23 of junction 24 at the same time that the ground reflected energy B collected by horn antenna 25 is supplied through a section of wave guide 26 to the shunt arm 27 of junction 24. The ground reflected energy $a$ divides equally between the two symmetrical arms of the junction 24 as did the received target energy, and the ground reflected energy B also divides equally between the two symmetrical arms. However, the electric vector of the portion of the ground reflected energy $a$ in one of the symmetrical arms of the hybrid junction is opposite in direction to the electric vector of the portion of energy $a$ in the other symmetrical arm. On the other hand, the electric vectors of the two portions of the ground reflection energy B in the two symmetrical arms are in the same direction. As a result, one of the symmetrical arms of junction 24 contains the vector sum of energies $a$ and B while the other symmetrical arm contains the vector difference of the energies $a$ and B, i.e., energy B minus energy $a$. With the energy B several times larger than the energy $a$, the direction of the electric vector representing the sum of the two energies $a$ and B in one symmetrical arm is substantially the same as the direction of the electric vector representing the difference of the two energies $a$ and B in the other symmetrical arm.

Now, the energy reflected from the target and equally divided into the two symmetrical arms of junction 24 produces an electric vector in one of the symmetrical arms which is opposite in direction to the electric vector in the other symmetrical arm. Accordingly, it is possible to distinguish the target reflected energy from the ground reflected energy by comparing the phase of the energy in one symmetrical arm of junction 24 with respect to the phase of the energy in the other symmetrical arm. This phase comparison may be accomplished in the following manner.

The portion of the reflected target energy together with the vector sum of the ground reflection energies $a$ and B conveyed through one of the symmetrical arms of junction 24 is supplied through an adjustable phase shifter 28 to mixer 29, while the portion of the reflected target energy together with the vector difference of the ground reflection energies $a$ and B conveyed through the other symmetrical arm is supplied directly to mixer 30. The phase shifter 28 is adjusted to correct for any differential phase shift which might occur in coupling the symmetrical arms of junction 24 to the mixers 29 and 30. If no differential phase shift exists between the outputs from the two symmetrical arms of junction 24, the phase shifter 28 may be eliminated.

The combined energies supplied to mixer 29 from phase shifter 28 are heterodyned with a signal supplied to the mixer from local oscillator 31 through a wave guide T 32 and hybrid junction 33, and the difference frequency output signal voltage from mixer 29 is supplied to I.F. amplifier 34. In an analogous manner, the combined energies supplied to mixer 30 from junction 24 are heterodyned with the local oscillator signal and the difference frequency output signal voltage from mixer 30 is supplied to I.F. amplifier 35.

The impedance Z coupled to junction 33 insures that the local oscillator energy divides substantially equally between the two mixers 29 and 30, and that the impedance reflected back to the local oscillator remains substantially constant for small changes in the load characteristics of the two mixers 29 and 30. The impedance Z matches the characteristic impedance of the wave guide.

The local oscillator 31 also supplies a signal through the wave guide T 32 to a conventional A.F.C. mixer 36 where it is heterodyned with an attenuated portion of the transmitter energy loosely coupled to mixer 36 from the wave guide coupler 19. The difference frequency output voltage from mixer 36 is applied to a conventional automatic frequency control circuit 37 which automatically maintains the frequency of the local oscillator 31 at a predetermined value.

The output voltage from I.F. amplifier 34 is compared in phase with the output voltage from I.F. amplifier 35 in phase comparator 38. The output from the phase comparator is of the form of video pulses of one polarity representing the target, and video pulses of the opposite polarity representing the ground reflection. While it is possible to simultaneously reverse the polarities of both the target pulses and the ground reflection pulses by interchanging the shunt and series arms of the hybrid junction 24 or by reversing the phase of one of the inputs to phase comparator 38, the polarity of the target pulses are always reversed with respect to the polarity of the ground reflection pulses as long as the ground reflection energy B collected by horn 25 exceeds the ground reflection energy $a$ collected by reflector 22 due to the response of its side lobe 15.

The output pulses from phase comparator 38, when amplified by video amplifier 39 and displayed on a conventional cathode ray tube indicator 40, can be made to appear as shown in the illustration in FIG. 3. In this presentation, the target pulse appears as a positive deflection 41 above the horizontally swept trace while the ground reflection appears as a negative deflection 42 downward from the horizontal trace. The horizontal sweep of the cathode ray beam is synchronized to the transmitted pulses by a synchronizing pulse voltage supplied to the indicator 40 from the pulse modulator 17.

The output pulses from video amplifier 39 may also be supplied to conventional automatic ranging circuits 44 through a diode rectifier or clipper 43. The diode stage passes only the positive pulses 41 to the conventional range circuits 44 which may be of the type described in section 9.1 on page 342 of the book Electronic Time Measurements, published by the Mc-Graw-Hill Book Company. These ranging circuits will automatically and continuously measure the range to the nearest positive target pulse 41, i.e., the first positive target pulse to arrive at the radar system following the transmission of each radar pulse. The diode rectifier 43 insures that the ranging circuits will not measure the range to the ground reflection pulses 42. This is true even though the ground reflection pulses may be received by the radar system before the arrival of the target echoes. The diode rectifier 43 may be eliminated whenever an automatic ranging circuit that is responsive only to positive pulses is employed.

The above ranging circuits produce a direct output voltage on lead 45 whose magnitude is proportional to the range of the target. Other well-known automatic ranging circuits such as the one described in U.S. Patent No. 2,478,778 may be employed to automatically indicate target range on a dial or counter.

An alternative arrangement for connecting the magic tee or hybrid junction 24 in the system of FIG. 2 may be employed by coupling the duplexer 20 to one of the symmetrical arms of the junction, the horn antenna 25 to the other symmetrical arm, the mixer 30 to either the series arm 23 or the shunt arm 27, and the phase shifter 28 to the remaining arm. With this circuit configuration, the overall system performs in substantially the same manner as described above.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An airborne radar system comprising, first antenna means for radiating energy in the direction of a target whose range is to be measured and for collecting a portion of the energy reflected therefrom, said first antenna means also radiating some energy downward toward the earth from a side lobe thereof and similarly collecting some of the energy reflected upward therefrom, transmitter means coupled to said first antenna means for supplying energy thereto, second antenna means directed toward the earth for response to energy reflected upward therefrom, a high frequency hybrid bridge circuit having a series arm, a shunt arm, and two symmetrical arms, means coupling one of said antenna means to said series arm, means coupling the other of said antenna means to said shunt arm, first amplifier means coupled to one of said symmetrical arms for producing a first amplified output voltage varying according to the vector sum of the energy reflected from the earth and collected by said first antenna means and the energy reflected from the earth and collected by said second antenna means, second amplifier means coupled to the other of said symmetrical arms for producing a second amplified output voltage varying according to the vector difference between the energy reflected by the earth and collected by said first antenna means and the energy reflected from the earth and collected by said second antenna means, phase comparator means coupled to said first and second amplifier means for producing an output voltage varying according to the relative phase difference between the amplified vector sum voltage and the amplified vector difference voltage, and utilization means coupled to said phase comparator means.

2. The apparatus as defined in claim 1, wherein said first amplifier means and said second amplifier means include respective first and second superheterodyne mixers and a common high frequency oscillator coupled thereto.

3. The apparatus as defined in claim 1 wherein said second antenna means directed toward the earth possesses a higher gain than the gain in the side lobe response of said first antenna means collecting the energy reflected from the earth.

4. An airborne radar system comprising, first antenna means for radiating energy toward a target and for collecting some of the energy reflected therefrom, said first antenna means also radiating energy toward the earth from a side lobe thereof and collecting some of the energy reflected therefrom, transmitter means coupled to said first antenna means for supplying energy thereto, second antenna means directed toward the earth for response to energy reflections therefrom, a hybrid junction having four arms, a first pair of said arms extending in directions parallel to each other, a second pair of said arms extending in directions perpendicular to said first pair of arms, means coupling said first antenna means to one of the arms of said second pair of arms, means coupling said second antenna means to the other arm of said second pair of arms, means including a first amplifier coupled to one of the arms of said first pair of arms, means including a second amplifier coupled to the other arm of said first pair of arms, phase comparator means coupled to said first and second amplifier means, and utilization means coupled to said phase comparator means.

5. In an air-to-air radar system, first antenna means for radiating energy in the direction of a target whose range is to be measured and for collecting a portion of the energy reflected therefrom, said first antenna means also radiating some energy downward toward the earth from a side lobe thereof and collecting some of the energy reflected upward therefrom, transmitter means coupled to said first antenna means for supplying energy thereto, second antenna means directed downward toward the earth and responsive to the transmitted energy reflected upward therefrom, said second antenna means possessing a higher gain than the gain provided by the side lobe response of said first antenna means collecting energy reflected from the earth, means including a combining means coupled to said first and second antenna means for combining the energy reflected from the earth and collected by said first antenna means with the energy reflected from the earth and collected by said second antenna means, said combining means producing a first output voltage varying according to the vector sum of the two energies reflected from the earth and producing a second output voltage varying according to the vector difference of the two energies reflected from the earth, first amplifier means coupled to said combining means for amplifying said vector sum output voltage, second amplifier means coupled to said combining means for amplifying said vector difference output voltage, phase comparator means coupled to said first and second amplifier means for producing an output voltage varying according to the relative phase difference between the amplified vector sum voltage and the amplified vector difference voltage, and utilization means coupled to said phase comparator means.

6. The apparatus as defined in claim 5 wherein said utilization means includes a cathode ray indicator for displaying a representation of said target and the earth.

7. The apparatus as defined in claim 5 wherein said utilization means includes a ranging circuit for automatically measuring the range to said target.

8. An airborne radar system comprising, first antenna means for radiating energy in the direction of a target whose range is to be measured and for collecting a portion of the energy reflected therefrom, said first antenna means also radiating some energy downward toward the earth from a side lobe thereof and collecting a portion of the energy reflected upward therefrom, transmitter means coupled to said first antenna means for supplying energy thereto, second antenna means directed toward the earth for response to energy reflections upward therefrom, said second antenna means producing a stronger response from the reflections from the earth than produced by the response of said first antenna means, a high frequency hybrid bridge circuit having a series arm, a shunt arm, and two symmetrical arms, means coupling said first antenna means to said series arm, means coupling said second antenna means to said shunt arm, phase comparator means having first and second input circuits, means coupling one of said symmetrical arms to said first input circuit and means coupling the other of said symmetrical arms to said second input circuit of said phase comparator means, and utilization means coupled to said phase comparator means.

9. In an air-to-air radar system, first antenna means for radiating energy in the direction of a target whose range is to be measured and for collecting a portion of the energy reflected therefrom, said first antenna means also radiating some energy downward toward the earth from a side lobe thereof and collecting a portion of the energy reflected upward therefrom, transmitter means coupled to said first antenna means for supplying energy thereto, second antenna means directed toward the earth and responsive to the transmitted energy reflected upward therefrom, means including an ultra-high frequency combining means coupled to said first and second antenna means for combining the energies reflected from the ground and collected by said first and second antenna means, said means including said combining means having first and second output circuits, said first output circuit producing a voltage varying according to the vector sum of the energies collected by said first and second antenna means, said second output circuit producing a voltage varying according to the vector difference of the energies collected by said first and second antenna means, and phase comparator means coupled to said first and second output circuits.

10. An airborne radar system for determining distance to energy-reflecting objects displaced from the craft in plan position and distinguishing the distances of such objects from the ground clearance altitude of the system, comprising a main radar antenna having high directivity and adapted for aiming toward an object whose range is to be measured, a pulse radar transmitter coupled to said main radar antenna, a downwardly aimed directive antenna having lower directivity than said main radar antenna, first and second energy receiving channels, means coupling said main radar antenna and said downwardly aimed antenna to said first and second receiving channels, said last-named means comprising means for supplying to said first channel a first version of the signal energy received by said main radar antenna and a second version of the signal energy received by said downwardly aimed antenna, added vectorially, and for supplying to said second channel said first and second versions, subtracted vectorially, and means including a phase comparator circuit coupled to said first and second receiving channels and receiving the outputs thereof for providing output signals of one polarity in response to energy received substantially exclusively by said main radar antenna, and for providing output signals of the opposite polarity in response to signals received predominantly by said downwardly aimed antenna.

11. A radar system having first and second independent antennas, said first antenna having relatively high directivity along its main lobe, said second antenna having less directivity and lower gain along its main lobe, said first and second antennas being independently aimable, transmitter means coupled to said first antenna for supplying energy thereto, ultra-high frequency combining means coupled to said first and second antennas for combining the energies collected thereby, said combining means including means for producing a first output voltage varying according to the vector sum of the energies collected by said first and second antenna means and means for producing a second output voltage varying according to the vector difference of the energies collected by said first and second antennas, and phase comparator means coupled to said first and second output circuits.

References Cited in the file of this patent

UNITED STATES PATENTS

| 2,567,197 | Fox | Sept. 11, 1951 |
| 2,604,621 | Earp | July 22, 1952 |
| 2,608,683 | Blewett | Aug. 26, 1952 |
| 2,631,278 | Kiebert | Mar. 10, 1953 |